United States Patent
Takei et al.

(10) Patent No.: US 10,897,190 B2
(45) Date of Patent: Jan. 19, 2021

(54) POWER SUPPLY DEVICE, POWER CONTROL APPARATUS, AND RELAY DETERMINATION METHOD FOR POWER SUPPLY DEVICE

(71) Applicant: Murata Manufacturing Co., Ltd., Nagaokakyo (JP)

(72) Inventors: Yousuke Takei, Nagaokakyo (JP); Shuichi Tagawa, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 16/840,851

(22) Filed: Apr. 6, 2020

(65) Prior Publication Data

US 2020/0235664 A1 Jul. 23, 2020

Related U.S. Application Data

(63) Continuation of application No. PCT/JP2018/035933, filed on Sep. 27, 2018.

(30) Foreign Application Priority Data

Oct. 17, 2017 (JP) .................................. 2017-201280

(51) Int. Cl.
*H02M 1/32* (2007.01)
*H02M 1/36* (2007.01)
(Continued)

(52) U.S. Cl.
CPC .............. *H02M 1/32* (2013.01); *H02M 1/36* (2013.01); *H02M 3/156* (2013.01); *H02M 7/537* (2013.01);
(Continued)

(58) Field of Classification Search
CPC ........ H02M 3/156; H02M 7/537; H02M 1/36; H02M 2001/007; H02M 1/32;
(Continued)

(56) References Cited

U.S. PATENT DOCUMENTS

2009/0108674 A1* 4/2009 Ozaki ..................... B60L 50/16
307/10.6
2010/0038962 A1* 2/2010 Komatsu ................. B60L 58/22
307/10.1

(Continued)

FOREIGN PATENT DOCUMENTS

| JP | 2000134707 A | 5/2000 |
|---|---|---|
| JP | 2009259762 A | 11/2009 |
| JP | 2013158185 A | 8/2013 |

OTHER PUBLICATIONS

International Search Report issued for PCT/JP2018/035933, dated Nov. 20, 2018.

(Continued)

*Primary Examiner* — Alex Torres-Rivera
(74) *Attorney, Agent, or Firm* — Arent Fox LLP (57) ABSTRACT

A storage device that includes a first switching circuit connected to a direct-current voltage bus and a second switching circuit connected between the first switching circuit and a DC-DC converter. A smoothing capacitor is connected between the DC-DC converter and the switching circuit. Moreover, the second switching circuit includes a pair of relays connected in series between the first switching circuit and the DC-DC converter and an inrush current prevention circuit connected in parallel with the series circuit of the relays. A first voltage sensor is connected to a node between the pair of relays and a second voltage sensor is connected between both terminals of the smoothing (Continued)

capacitor. A control unit determines the presence of welding at the relays on the basis of voltage values detected by the voltage sensors.

20 Claims, 8 Drawing Sheets

(51) Int. Cl.
*H02M 3/156* (2006.01)
*H02M 7/537* (2006.01)
*H02S 40/32* (2014.01)
*H02M 1/00* (2006.01)

(52) U.S. Cl.
CPC ....... *H02M 2001/007* (2013.01); *H02S 40/32* (2014.12); *Y02E 10/56* (2013.01)

(58) Field of Classification Search
CPC .. H02M 3/155; H02H 3/05; H02J 7/34; Y02E 10/56; Y02E 10/563; Y02E 10/58; H02S 40/32; H01H 47/00; H01M 10/04
See application file for complete search history.

(56) References Cited

U.S. PATENT DOCUMENTS

| | | | |
|---|---|---|---|
| 2010/0244558 A1* | 9/2010 | Mitsutani | B60L 3/0038 307/9.1 |
| 2011/0140520 A1* | 6/2011 | Lee | H02J 9/062 307/25 |
| 2014/0009090 A1* | 1/2014 | Ashida | B60L 3/04 318/139 |
| 2014/0225430 A1* | 8/2014 | Oyobe | H02J 1/08 307/9.1 |
| 2015/0183325 A1* | 7/2015 | Mitsutani | B60L 53/14 307/10.1 |
| 2015/0280603 A1* | 10/2015 | Yuasa | H02M 1/36 363/37 |
| 2016/0207403 A1* | 7/2016 | Iida | B60L 53/22 |
| 2017/0346294 A1* | 11/2017 | Lung | H02J 3/385 |
| 2018/0123508 A1* | 5/2018 | Inoue | H02J 7/35 |

OTHER PUBLICATIONS

Written Opinion of the International Searching Authority issued for PCT/JP2018/035933, dated Nov. 20, 2018.

* cited by examiner

POWER SUPPLY DEVICE, POWER CONTROL APPARATUS, AND RELAY DETERMINATION METHOD FOR POWER SUPPLY DEVICE

CROSS REFERENCE TO RELATED APPLICATIONS

The present application is a continuation of PCT/JP2018/035933 filed Sep. 27, 2018, which claims priority to Japanese Patent Application No. 2017-201280, filed Oct. 17, 2017, the entire contents of each of which are incorporated herein by reference.

TECHNICAL FIELD

The present invention relates to a power supply device, a power control apparatus, and a relay determination method for the power supply device.

BACKGROUND

Currently, power supply devices in the related art for supplying a direct-current voltage from a power supply, such as a secondary battery, include relays for controlling the output of the direct-current voltage. A power supply device for outputting a high direct-current voltage includes an inrush current prevention circuit connected in parallel with a main relay (see, for example, Patent Document 1—identified below). The inrush current prevention circuit includes a resistor and a current-limiting relay connected in series with the resistor and prevents an inrush current to, for example, a smoothing capacitor by closing the main relay after closing the current-limiting relay.

Patent Document 1: Japanese Unexamined Patent Application Publication No. 2000-134707.

At a relay that mechanically brings contacts into contact with each other or separates them from each other, a failure such as contact welding may occur. The determination of whether there is a failure at a relay is therefore needed.

SUMMARY OF THE INVENTION

Accordingly, it is an object of the present invention to determine whether there is a failure at a relay.

In an exemplary aspect, a power supply device is provided that disclosure includes a direct-current power supply, a first switching circuit, a second switching circuit, a first capacitor, a first voltage detection unit, a second voltage detection unit, and a control unit. The first switching circuit is configured to bring the direct-current power supply into contact with an object to be connected and separate the direct-current power supply from the object to be connected. The second switching circuit includes a series circuit including a first relay and a second relay connected in series between the first switching circuit and the direct-current power supply and a first inrush current prevention circuit connected in parallel with the series circuit. The first capacitor is connected between the direct-current power supply and the second switching circuit. The first voltage detection unit is configured to detect a voltage between a low-voltage-side terminal of the first capacitor and a node between the first relay and the second relay. Moreover, the second voltage detection unit is configured to detect a voltage between the low-potential-side terminal and a high-potential-side terminal of the first capacitor. The control unit is configured to control the first switching circuit and the second switching circuit.

With this configuration, the second switching circuit connected between the direct-current power supply and the first switching circuit includes the series circuit of the first relay and the second relay. It should be appreciated that welding is highly unlikely to simultaneously occur at the first relay and the second relay. As compared with a configuration in which the second switching circuit includes a single relay, this configuration can suppress the continuous connection between the direct-current power supply and the first switching circuit. On the basis of a first voltage value detected by the first voltage detection unit connected to the node between the first relay and the second relay and a second voltage value detected by the second voltage detection unit connected between the both terminals of the first capacitor, the presence of welding at each of the first relay and the second relay can be determined.

In the above-described power supply device, the first inrush current prevention circuit preferably includes a current-limiting resistor connected between a terminal of the second relay on a side of the direct-current power supply and a terminal of the first relay on a side of the first switching circuit.

With this configuration, inrush current to the first capacitor can be prevented by the current-limiting resistor. Moreover, by disposing only the current-limiting resistor, the increase in cost of the power supply device is suppressed.

In the above-described power supply device, the first inrush current prevention circuit preferably includes a first current-limiting resistor and a relay connected in series between a terminal of the second relay on a side of the direct-current power supply and a terminal of the first relay on a side of the first switching circuit.

With this configuration, inrush current to the first capacitor can be prevented by the first current-limiting resistor. Moreover, by turning off the relay, the flow of a current through the first current-limiting resistor can be prevented.

In the above-described power supply device, the direct-current power supply preferably includes a secondary battery and a bidirectional DC (direct current)-DC converter configured to perform voltage conversion upon an output voltage of the secondary battery and to output a resultant voltage to the object to be connected and to perform voltage conversion upon an output voltage of the object to be connected and output a resultant voltage to the secondary battery.

With this configuration, the discharging power of the secondary battery can be supplied to the object to be connected. The secondary battery can be charged with the direct-current voltage of the object to be connected.

The above-described power supply device preferably further includes a third switching circuit and a second capacitor. The third switching circuit preferably includes a third relay connected between the secondary battery and the bidirectional DC-DC converter and a second inrush current prevention circuit connected in parallel with the third relay. The second capacitor is preferably connected between the third switching circuit and the bidirectional DC-DC converter.

With this configuration, the secondary battery can be brought into contact with the bidirectional DC-DC converter and can be separated from the bidirectional DC-DC converter. When there is a connection to the secondary battery, the second inrush current prevention circuit can prevent the occurrence of an inrush current to the second capacitor.

In the above-described power supply device, the second inrush current prevention circuit preferably includes a current-limiting resistor and a fourth relay connected in series between both terminals of the third relay.

With this configuration, the current-limiting resistor is configured to prevent the occurrence of an inrush current by limiting the discharging current of the secondary battery. By turning off the fourth relay, the flow of a current through the second current-limiting resistor can be prevented.

In another exemplary aspect, a power control apparatus is provide that is configured to convert a direct-current voltage input from a power generator into an alternating-current voltage and output the alternating-current voltage. The power control apparatus includes a direct-current voltage bus to which a direct-current voltage input from the power generator is supplied, an inverter configured to convert a direct-current voltage of the direct-current voltage bus into an alternating-current voltage, and a power supply device connected to the direct-current voltage bus. The power supply device includes a direct-current power supply, a first switching circuit, a second switching circuit, a first capacitor, a first voltage detection unit, a second voltage detection unit, and a control unit. The first switching circuit is configured to bring the direct-current power supply into contact with the direct-current voltage bus and separate the direct-current power supply from the direct-current voltage bus. The second switching circuit includes a series circuit including a first relay and a second relay connected in series between the first switching circuit and the direct-current power supply and a first inrush current prevention circuit connected in parallel with the series circuit. The first capacitor is connected between the direct-current power supply and the second switching circuit. The first voltage detection unit is configured to detect a voltage between a low-voltage-side terminal of the first capacitor and a node between the first relay and the second relay. The second voltage detection unit is configured to detect a voltage between the low-potential-side terminal and a high-potential-side terminal of the first capacitor. The control unit is configured to control the first switching circuit and the second switching circuit.

With this configuration, the second switching circuit connected between the direct-current power supply and the first switching circuit includes the series circuit of the first relay and the second relay. It should be appreciated that welding is highly unlikely to simultaneously occur at the first relay and the second relay. As compared with a configuration in which the second switching circuit includes a single relay, this configuration can suppress the continuous connection between the direct-current power supply and the first switching circuit. On the basis of a first voltage value detected by the first voltage detection unit connected to the node between the first relay and the second relay and a second voltage value detected by the second voltage detection unit connected between the both terminals of the first capacitor, the presence of welding at each of the first relay and the second relay can be determined.

The above-described power control apparatus preferably further includes a voltage conversion circuit. Moreover, the power generator is preferably a solar photovoltaic panel. The voltage conversion circuit is preferably connected to the solar photovoltaic panel and is preferably configured to convert a first direct-current voltage output from the solar photovoltaic panel into a second direct-current voltage and output the second direct-current voltage to the direct-current voltage bus.

With this configuration, the power supply device can be brought into contact with the direct-current voltage bus and be separated from the direct-current voltage bus in the apparatus for converting a direct-current voltage generated by the solar photovoltaic panel into an alternating-current voltage and outputting the alternating-current voltage.

In another exemplary aspect, a relay determination method is provided for a power supply device that includes a direct-current power supply, a first switching circuit, a second switching circuit, a first capacitor, a first voltage detection unit, a second voltage detection unit, and a control unit. The method includes bring, by the first switching circuit, the direct-current power supply into contact with an object to be connected and separate the direct-current power supply from the object to be connected. The second switching circuit includes a series circuit including a first relay and a second relay connected in series between the first switching circuit and the direct-current power supply, and a first inrush current prevention circuit connected in parallel with the series circuit. The first capacitor is connected between the direct-current power supply and the second switching circuit. The method further includes detecting, by a first voltage detection unit, a voltage between a low-voltage-side terminal of the first capacitor and a node between the first relay and the second relay, and detecting, by a second voltage detection, a voltage between the low-potential-side terminal and a high-potential-side terminal of the first capacitor. The control unit is configured to control the first switching circuit and the second switching circuit. The power supply device relay determination method includes causing the control unit to control opening and closing of the first relay and the second relay and determine presence of welding at the first relay and the second relay on the basis of a first voltage value detected by the first voltage detection unit and a second voltage value detected by the second voltage detection unit.

With this configuration, on the basis of the first voltage value detected by the first voltage detection unit connected to the node between the first relay and the second relay and the second voltage value detected by the second voltage detection unit connected between the both terminals of the first capacitor, the presence of welding at each of the first relay and the second relay can be determined.

In the above-described power supply device relay determination method, the control unit preferably determines presence of welding at the first relay and the second relay on the basis of a first comparison result and a second comparison result. The first comparison result is a result of comparison between a first voltage value detected by the first voltage detection unit and a second voltage value detected by the second voltage detection unit in a state where the first relay is opened and the second relay is closed. The second comparison result is a result of comparison between a first voltage value detected by the first voltage detection unit and a second voltage value detected by the second voltage detection unit in a state where the first relay is closed and the second relay is opened.

With this configuration, on the basis of a result of the comparison between the first voltage value and the second voltage value, the presence of welding at each of the first relay and the second relay can be determined.

In the above-described power supply device relay determination method, the direct-current power supply preferably includes a secondary battery, a bidirectional DC-DC converter, a third switching circuit, and a second capacitor. The bidirectional DC-DC converter is configured to perform voltage conversion upon an output voltage of the secondary battery and output a resultant voltage to the object to be connected and to perform voltage conversion upon an output voltage of the object to be connected and output a resultant voltage to the secondary battery. The third switching circuit includes a third relay connected between the secondary battery and the bidirectional DC-DC converter and a second inrush current prevention circuit connected in parallel with the third relay and is configured to be controlled by the control unit. The second inrush current prevention circuit includes a fourth relay and a second current-limiting resistor connected in series. The second capacitor is connected between the third switching circuit and the bidirectional DC-DC converter. The control unit preferably closes the third relay after a predetermined period of time has elapsed from closing of the fourth relay and determines presence of welding at the first relay and the second relay in a state where the fourth relay is opened.

With this configuration, the discharging power of the secondary battery can be supplied to the object to be connected. The secondary battery can be charged with the direct-current voltage of the object to be connected. The secondary battery can be brought into contact with the bidirectional DC-DC converter and can be separated from the bidirectional DC-DC converter. When there is a connection to the secondary battery, the second inrush current prevention circuit can prevent the occurrence of an inrush current to the second capacitor. The secondary battery can charge the first capacitor. On the basis of the charging voltage for the first capacitor, the presence of welding at each of the first relay and the second relay can be determined.

With a power supply device, a power control apparatus, a relay determination method for the power supply device according to the present invention, a failure at a relay can be determined.

DESCRIPTION OF EMBODIMENTS

An exemplary embodiment of the present invention will be described below.

It is note that some components of the exemplary embodiment can sometimes be illustrated in an enlarged manner in the accompanying drawings for ease of understanding. The dimensional ratios of the components may sometimes be different from the dimensional ratios of actual components or may sometimes differ between those in the drawings. In a cross-sectional view, hatching may sometimes be omitted for some of the components for ease of understanding.

Figure 1:
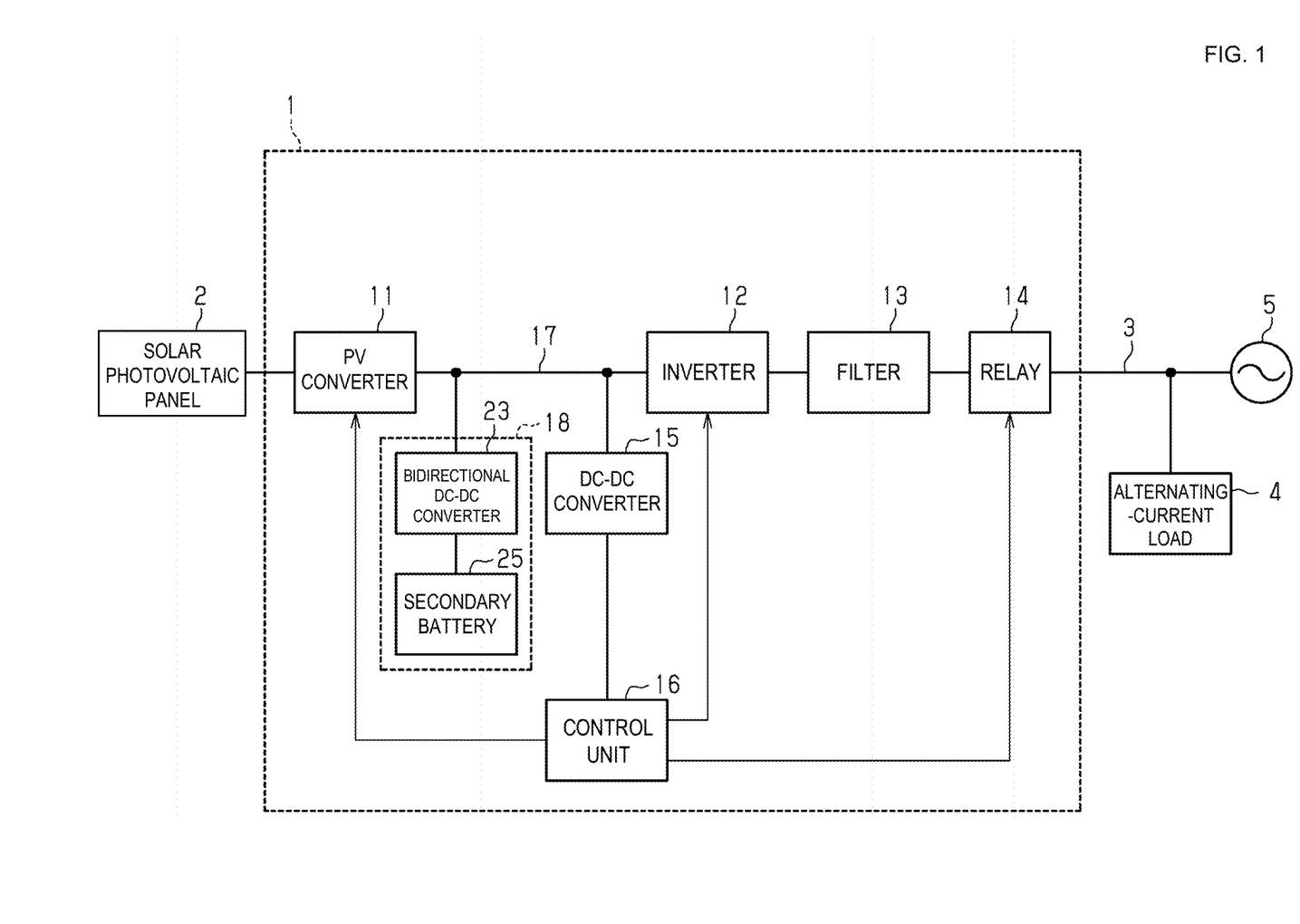
FIG. 1 is a circuit diagram of a photovoltaic power generation system.

As illustrated in FIG. 1, a power conditioner 1 that is a power supply system is connected to a solar photovoltaic panel 2. The power conditioner 1 is connected to an alternating-current load 4 via a power line 3.

In an exemplary aspect, the alternating-current load 4 is, for example, an interior load connected to a distribution panel board. Examples of an interior load include electrical equipment in ordinary houses, such as light, a refrigerator, a washing machine, an air conditioner, or a microwave oven. The alternating-current load 4 may be electrical equipment in commercial facilities or factories. The power conditioner 1 converts direct-current power generated by the solar photovoltaic panel 2 into alternating-current power and outputs the alternating-current power. The alternating-current power is supplied to the alternating-current load 4.

For example, the power conditioner 1 is connected to a commercial power system 5 via the power line 3. Moreover, the commercial power system 5 is a distribution system in which an electric power company transmits power. The power conditioner 1 can connect or disconnect the solar photovoltaic panel 2 and the commercial power system 5.

As further shown, the power conditioner 1 includes a photovoltaic (PV) converter 11, an inverter 12, a filter 13, a relay 14, a DC-DC converter 15, and a control unit 16. The PV converter 11, the inverter 12, and the DC-DC converter 15 are connected to each other via a direct-current voltage bus (e.g., a high-voltage direct-current (HVDC) bus) 17.

The PV converter 11 is a step-up chopper circuit including a power semiconductor device and a reactor. The PV converter 11 operates in accordance with a control signal transmitted from the control unit 16. The PV converter 11 steps up a direct-current voltage input from the solar photovoltaic panel 2 and outputs the direct-current voltage to the direct-current voltage bus 17.

Moreover, the DC-DC converter 15 is, for example, a step-down circuit and converts the direct-current voltage of the direct-current voltage bus 17 into a direct-current voltage suitable for the operation of the control unit 16. The control unit 16 operates using a direct-current voltage supplied from the DC-DC converter 15 and controls the PV converter 11, the inverter 12, and the relay 14.

In addition, the inverter 12 is a DC-AC conversion circuit including a reactor and at least one bridge circuit including a pair of series-connected power semiconductor devices. The inverter 12 operates in accordance with a control signal transmitted from the control unit 16 and converts a voltage output from the PV converter 11 into an alternating-current voltage. The filter 13 reduces the high-frequency component of alternating-current power output from the inverter 12.

For system interconnection, the relay 14 is, for example, a normally-open electromagnetic relay. The control unit 16 is configured to control the closed and open states of the relay 14 using a control signal. The closing operation of the relay 14 causes an alternating-current voltage generated in accordance with the output voltage of the solar photovoltaic panel 2 to be supplied to the alternating-current load 4. When the power line 3 is connected to the commercial power system 5, the closing and opening operations of the relay 14 lead to the connection and disconnection between the solar photovoltaic panel 2 and the commercial power system 5, respectively.

As further shown, a storage device 18 is connected to the direct-current voltage bus 17 in the power conditioner 1. The storage device 18 is detachable/attachable from/to the direct-current voltage bus 17 via, for example, a connector (not illustrated). On one exemplary aspect, the storage device 18 may be directly connected to the direct-current voltage bus 17, that is, does not necessarily have to be detachable/attachable from/to the direct-current voltage bus 17.

The storage device 18 includes a direct-current voltage conversion circuit (e.g., a DC-DC converter) 23 and a secondary battery 25. The secondary battery 25 is a chargeable and dischargeable battery. Examples of the secondary battery 25 include a lithium-ion battery. The DC-DC converter 23 is a bidirectional direct-current voltage conversion circuit. The DC-DC converter 23 converts the direct-current power of the direct-current voltage bus 17 into direct-current power with which the secondary battery 25 is to be charged. The DC-DC converter 23 converts direct-current power discharged by the secondary battery 25 into direct-current power of a voltage for the direct-current voltage bus 17.

In this embodiment, while the solar photovoltaic panel 2 generates power, the voltage value of the direct-current voltage bus 17 in the power conditioner 1 is, for example, 360 V. Moreover, the secondary battery 25 that is being charged outputs the direct-current voltage of, for example, 300 V.

The direct-current power of the direct-current voltage bus 17 illustrated in FIG. 1 can be obtained from the alternating-current power of the commercial power system 5. By using a bidirectional inverter as the inverter 12 illustrated in FIG. 1, the inverter 12 converts the alternating-current power of the commercial power system 5 into direct-current power and supplies the direct-current power to the direct-current voltage bus 17. The direct-current power supplied to the direct-current voltage bus 17 is stepped down by the DC-DC converter 23 illustrated in FIG. 2 and is supplied to the secondary battery 25.

Figure 2:
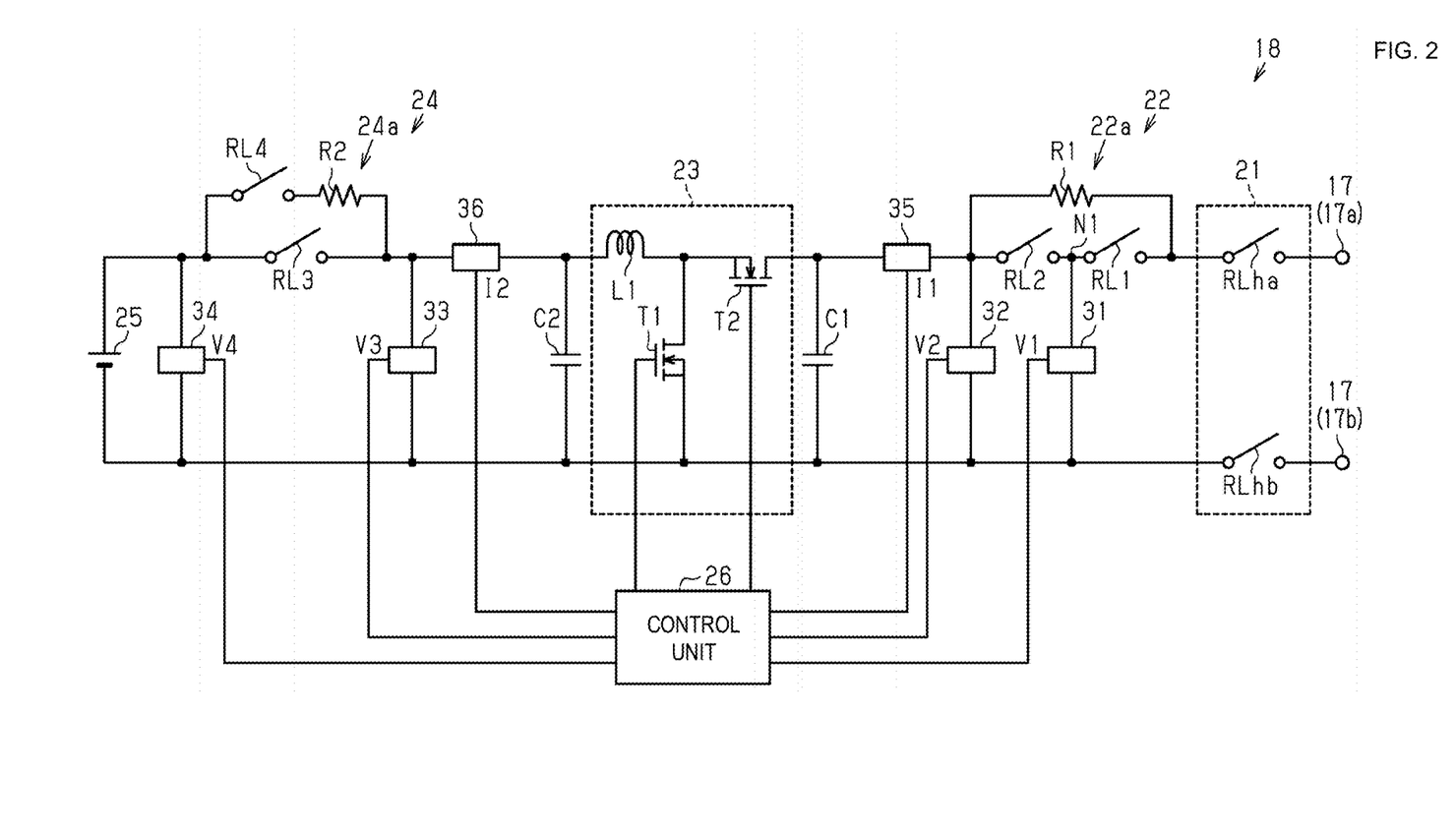
FIG. 2 is a circuit diagram of a direct-current power supply device.

The exemplary structure of the storage device 18 will now be described.

As illustrated in FIG. 2, the storage device 18 includes the secondary battery 25, switching circuits 21, 22, and 24, the DC-DC converter 23, smoothing capacitors C1 and C2, and a control unit 26.

First, the schematic structure of the storage device 18 will be described.

The direct-current voltage bus 17 is connected to the secondary battery 25 via the switching circuits 21 and 22, the DC-DC converter 23, and the switching circuit 24. The direct-current voltage bus 17 includes a high-potential-side electric wire 17a and a low-potential-side electric wire 17b. Moreover, the switching circuit 21 includes a relay RLha connected to the high-potential-side electric wire 17a in the direct-current voltage bus 17 and a relay RLhb connected to the low-potential-side electric wire 17b. The relays RLha and RLhb are, for example, normally-open electromagnetic relays, and are opened or closed in response to a control signal transmitted from the control unit 26.

The smoothing capacitor C1 is connected between the switching circuit 22 and the DC-DC converter 23. Specifically, the smoothing capacitor C1 is connected between both terminals (i.e., a high-potential-side terminal and a low-potential-side terminal) of the DC-DC converter 23 on the side of the direct-current voltage bus 17. Examples of the smoothing capacitor C1 include an aluminum electrolytic capacitor and a tantalum electrolytic capacitor. The switching circuit 22 is connected between the relay RLha in the switching circuit 21 and the high-potential-side terminal of the DC-DC converter 23.

The DC-DC converter 23 is connected to the secondary battery 25 via the switching circuit 24. The DC-DC converter 23 has a terminal (i.e., a high-potential-side terminal) connected to a positive-side terminal of the secondary battery 25 via the switching circuit 24 and a terminal (i.e., a low-potential-side terminal) connected to a negative-side terminal of the secondary battery 25. That is, the switching circuit 24 is connected between the positive-side terminal of the secondary battery 25 and the high-potential-side terminal of the DC-DC converter 23.

The smoothing capacitor C2 is connected between the DC-DC converter 23 and the switching circuit 24. Specifically, the smoothing capacitor C2 is connected between the both terminals (i.e., the high-potential-side terminal and the low-potential-side terminal) of the DC-DC converter 23 on the side of the secondary battery 25. Examples of the smoothing capacitor C2 include an aluminum electrolytic capacitor and a tantalum electrolytic capacitor.

The switching circuit 22 includes relays RL1 and RL2 connected in series with each other. The relays RL1 and RL2 are, for example, normally-open electromagnetic relays. That is, the two relays RL1 and RL2 are present between the switching circuit 21 and the DC-DC converter 23. The relays RL1 and RL2 are opened or closed in response to a control signal transmitted from the control unit 26. The switching circuit 22 includes an inrush current prevention circuit 22a connected in parallel with the relays RL1 and RL2. In this embodiment, the inrush current prevention circuit 22a includes a current-limiting resistor R1 connected in parallel with a series circuit of the relays RL1 and RL2.

The DC-DC converter 23 includes an inductor L1 and transistors T1 and T2. The transistors T1 and T2 are, for example, N-channel metal oxide semiconductor field-effect transistors (MOSFETs). The gate terminals of the transistors T1 and T2 are connected to the control unit 26. The transistors T1 and T2 are turned on or off in response to a control signal output from the control unit 26. The control unit 26 controls the ON/OFF states of the transistors T1 and T2 to cause the DC-DC converter 23 to perform a step-down or step-up operation by performing, for example, pulse-width modulation (PWM) control. The transistors T1 and T2 may be insulated-gate bipolar transistors (IGBTs).

The DC-DC converter 23 is configured to step up the direct-current voltage of the secondary battery 25 and outputs the direct-current voltage. The output voltage of the DC-DC converter 23 is supplied to the direct-current voltage bus 17 via the switching circuits 22 and 21. The DC-DC converter 23 is also configured to step down the direct-current voltage supplied from the direct-current voltage bus 17 via the switching circuits 21 and 22 and outputs the direct-current voltage. The output voltage of the DC-DC converter 23 is supplied to the secondary battery 25 via the switching circuit 24 as a charging voltage.

The switching circuit 24 includes a relay RL3 connected between the secondary battery 25 and the DC-DC converter 23 and an inrush current prevention circuit 24a connected in parallel with the relay RL3. The relay RL3 is connected between the positive-side terminal of the secondary battery 25 and the DC-DC converter 23. The relay RL3 is, for example, a normally-open electromagnetic relay and is opened or closed in response to a control signal transmitted from the control unit 26. The closed relay RL3 (i.e., in a conduction state) connects the secondary battery 25 to the DC-DC converter 23.

The inrush current prevention circuit 24a includes a relay RL4 and a current-limiting resistor R2 connected in series with each other. The relay RL4 is, for example, a normally-open electromagnetic relay and is opened or closed in response to a control signal transmitted from the control unit 26. When the relay RL4 is closed, the discharging current of the secondary battery 25 is limited by the current-limiting resistor R2. The inrush current prevention circuit 24a prevents the occurrence of an inrush current at the time of the closing of the relay RL3.

The storage device 18 includes voltage sensors 31 and 32 and a current sensor 35.

The current sensor 35 is connected between the DC-DC converter 23 and the switching circuit 22. The current sensor 35 is configured to detect a current flowing between the DC-DC converter 23 and the switching circuit 22 and outputs a detected current value I1.

The voltage sensor 31 is provided between the negative-side terminal of the secondary battery 25 and a node N1 between the relays RL1 and RL2 in the switching circuit 22. The voltage sensor 31 is configured to detect a voltage between the node N1 and the negative-side terminal of the secondary battery 25 and outputs a detected voltage value V1.

The voltage sensor 32 is provided between both terminals, that is, a high-voltage-side terminal and a low-voltage-side terminal, of the smoothing capacitor C2. The voltage sensor 32 is configured to detect a voltage across the both terminals of the smoothing capacitor C2 and outputs a detected voltage value V2.

The storage device 18 includes voltage sensors 33 and 34 and a current sensor 36.

The voltage sensor 34 is provided between the positive-side terminal and negative-side terminal of the secondary battery 25. The voltage sensor 34 is configured to detect a voltage across the terminals of the secondary battery 25 and outputs a detected voltage value V4.

The voltage sensor 33 is provided in parallel with the smoothing capacitor C1. The voltage sensor 33 is configured to detect a voltage across the both terminals of the smoothing capacitor C1 and outputs a detected voltage value V3.

The current sensor 36 is provided between the switching circuit 24 and the DC-DC converter 23. The current sensor 36 is configured to detect a current flowing between the switching circuit 24 and the DC-DC converter 23 and outputs a detected current value I2.

For example, the output voltage of the DC-DC converter 23 illustrated in FIG. 1 is supplied to the control unit 26 as a driving voltage. The control unit 26 starts, for example, in response to the operation of a start switch provided in the storage device 18 and operates in accordance with a program set in advance.

After being started, the control unit 26 controls the respective relays in the switching circuits 21, 22, and 24 to connect/disconnect the secondary battery 25 and the direct-current voltage bus 17.

Moreover, the control unit 26 is configured to control the opening and closing of the relays RL3 and RL4 in the switching circuit 24 to prevent an inrush current from flowing through the smoothing capacitor C2.

In operation, the control unit 26 first closes the relay RL4 (closed circuit: ON). The discharging current of the secondary battery 25 is limited by the current-limiting resistor R2 and is supplied to the smoothing capacitor C2, so that the smoothing capacitor C2 is charged. Subsequently, the control unit 26 closes the relay RL3 and opens the relay RL4. For example, when a predetermined period of time has elapsed after closing the relay RL4, the control unit 26 closes the relay RL3 and opens the relay RL4. The predetermined period of time is set in accordance with the capacitance value of the smoothing capacitor C2 and a current value limited by the current-limiting resistor R2 such that the difference between the charging voltage for the smoothing capacitor C2 and the output voltage of the secondary battery 25 reduces. As a result, a high inrush current does not flow through the smoothing capacitor C2 and the DC-DC converter 23. The relays RL3 and RL4 may be controlled in accordance with the voltage value V3 detected by the voltage sensor 33.

When the storage device 18 is connected to the direct-current voltage bus 17 of a predetermined voltage (for example, 360 V), the control unit 26 controls the opening and closing of the relays included in the switching circuits 21 and 22 to prevent an inrush current from flowing through the smoothing capacitor C1.

The control unit 26 closes the relays RLha and RLhb in the switching circuit 21 in a state where the relays RL1 and RL2 in the switching circuit 22 are closed. A current is supplied from the direct-current voltage bus 17 to the smoothing capacitor C1 via the relay RLha and the inrush current prevention circuit 22a (e.g., the current-limiting resistor R1) in the switching circuit 22, so that the C1 is charged. Subsequently, the control unit 26 closes the relays RL1 and RL2 in the switching circuit 22. For example, when a predetermined period of time has elapsed after closing the relays RLha and RLhb, the control unit 26 closes the relays RL1 and RL2. The predetermined period of time is set in accordance with the capacitance value of the smoothing capacitor C1 and a current value limited by the current-limiting resistor R1 such that the difference between the charging voltage for the smoothing capacitor C1 and the voltage of the direct-current voltage bus 17 reduces. A high inrush current does not flow through the smoothing capacitor C1 and the DC-DC converter 23 because the difference between the terminal voltage of the smoothing capacitor C1 and the voltage value of the direct-current voltage bus 17 is small. The relays RL1 and RL2 may be controlled in accordance with the voltage value V2 detected by the voltage sensor 32.

The control unit 26 is configured to charge the secondary battery 25 with the direct-current power of the direct-current voltage bus 17, e.g., power generated by the solar photovoltaic panel 2 illustrated in FIG. 1. The control unit 26 causes the DC-DC converter 23 to perform a step-down operation such that the voltage value V3 becomes a voltage necessary for the charging of the secondary battery 25, and charges the secondary battery 25.

The control unit 26 is further configured to supply the discharging power of the secondary battery 25 to the direct-current voltage bus 17. For example, when the solar photovoltaic panel 2 illustrated in FIG. 1 does not generate power, the control unit 26 causes the DC-DC converter 23 to perform a step-up operation such that the voltage value V2 becomes a voltage value necessary for the direct-current voltage bus 17, and supplies a direct-current power based on the discharging power of the secondary battery 25 to the direct-current voltage bus 17.

The control unit 26 is yet further configured to perform startup processing at the time of startup thereof. In the startup processing, the control unit 26 determines whether there is the failure of a relay included in the storage device 18. The failures of an electromagnetic relay includes contact welding (e.g., welding in an ON state) representing a state where a relay is not opened while a closed circuit is kept (in an ON state) and a failure (e.g., welding in an OFF state) representing a state where a relay is not closed while an open circuit is kept (in an OFF state). Failure determination processing includes processing for determining whether there is a failure at the relays RL3 and RL4 included in the switching circuit 24 used for the interconnection with the secondary battery and processing for determining whether there is a failure at the relays RL1 and RL2 included in the switching circuit 22 used for interconnection protection. In the following description, the above-described failures are sometimes collectively called welding.

Figure 3:
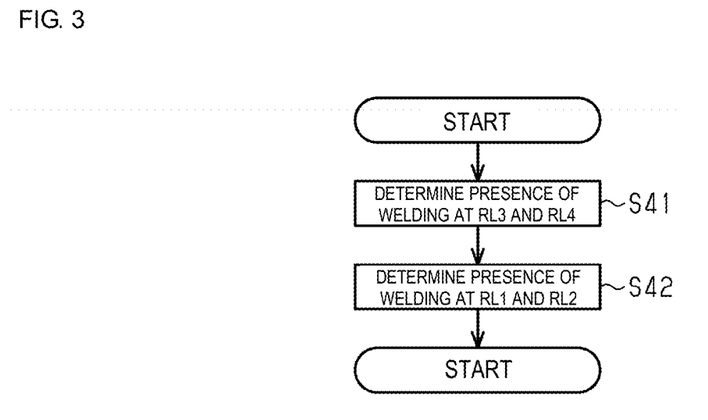
FIG. 3 is a flowchart illustrating a failure determination process.

As illustrated in FIG. 3, in step S41, the control unit 26 determines the presence of welding at the relays RL3 and RL4 included in the switching circuit 24. For example, the control unit 26 determines the presence of welding at the relays RL3 and RL4 on the basis of the voltage values V3 and V4 detected by the voltage sensors 33 and 34 illustrated in FIG. 2.

Subsequently, in step S42, the control unit 26 determines the presence of welding at the relays RL1 and RL2 included in the switching circuit 22. For example, the control unit 26 determines the presence of welding at the relays RL1 and RL2 on the basis of the voltage values V1 and V2 detected by the voltage sensors 31 and 32 illustrated in FIG. 2.

Before starting determination processing, the control unit 26 outputs a control signal for instructing each relay to open. In the following description, control processing for closing each relay is referred to as "turning on" and control processing for opening each relay is referred to as "turning off" for purposes of this disclosure.

An exemplary aspect of the processing of step S41 will be described.

First, the control unit 26 determines whether the voltage value V3 detected by the voltage sensor 33 is "0 V". When at least one of the relays RL3 and RL4 is welded, the smoothing capacitor C2 is charged with the discharging current of the secondary battery 25 via the welded relay. Accordingly, when the voltage value V3 is "0 V", it is determined that either of the relays RL3 and RL4 is not subjected to terminal welding. When the voltage value V3 is not "0 V", it is determined that at least one of the relays RL3 and RL4 is subjected to terminal welding. When the voltage value V3 is "0 V", the relay RL4 is turned on. In a case where the voltage value V3 increases at that time, it is determined that the relay RL4 normally operates.

When the voltage value V3 becomes a predetermined voltage, the relay RL3 is turned on and the relay RL4 is turned off. When the voltage value V3 increases, it is determined that the relay RL3 normally operates. When the voltage value V3 does not change, it is determined that the relay RL4 is not turned off because of abnormality. When it is determined that welding does not occur at either of the relays RL3 and RL4, the processing for determining the presence of welding at the switching circuit 24 ends.

An exemplary aspect of the processing of step S42 will be described.

Figure 4:
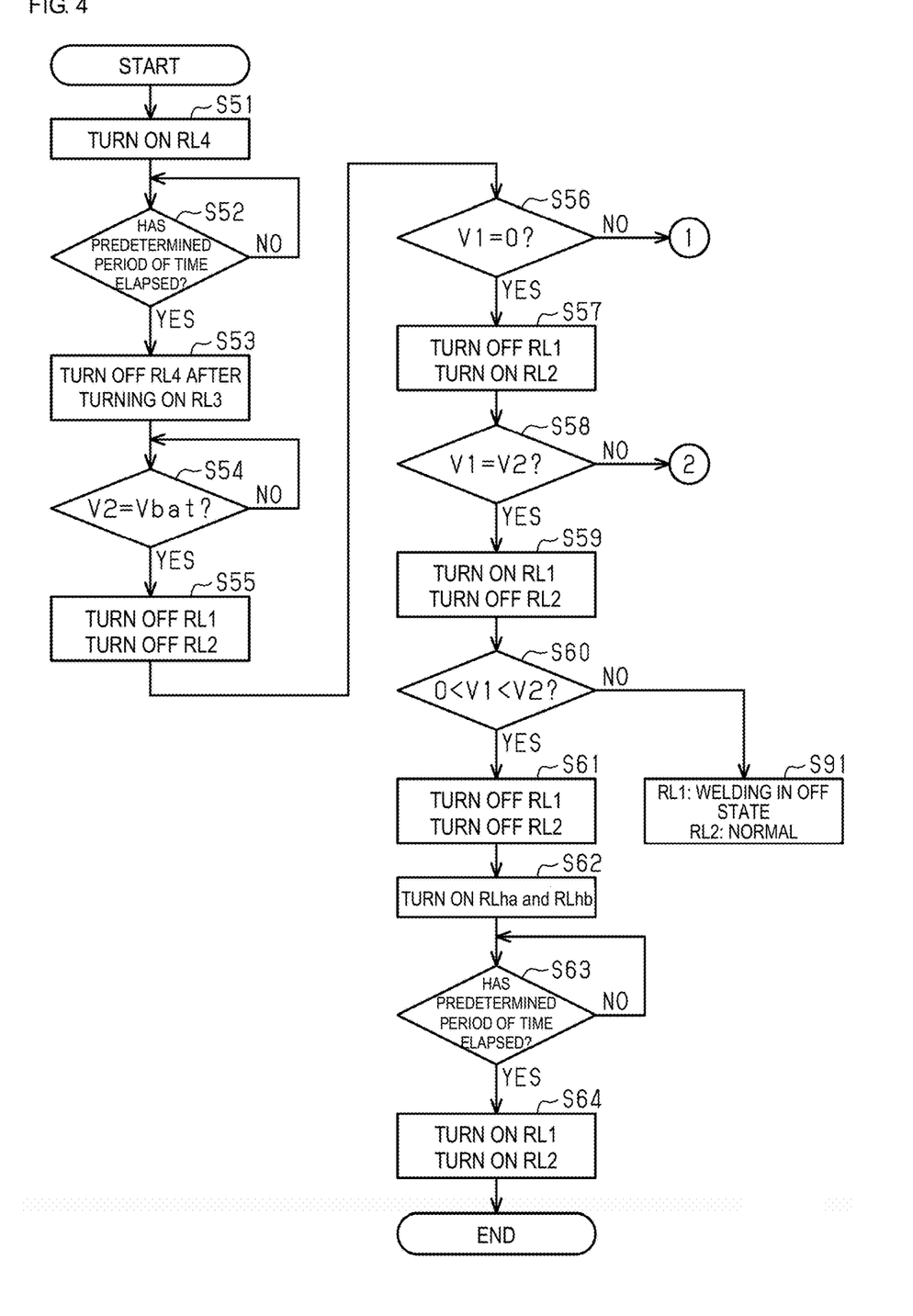
FIG. 4 is a flowchart illustrating a failure determination process.
Figure 5:
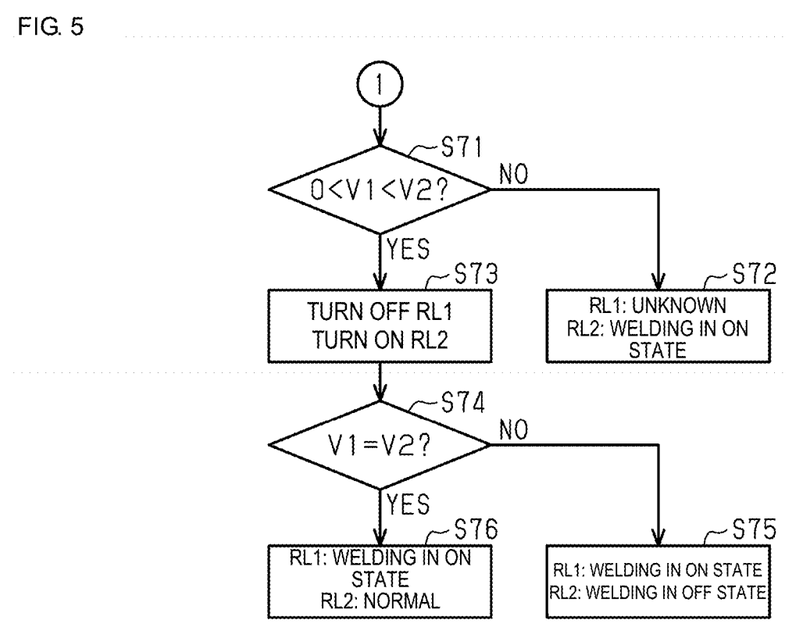
FIG. 5 is a flowchart illustrating a failure determination process.
Figure 6:
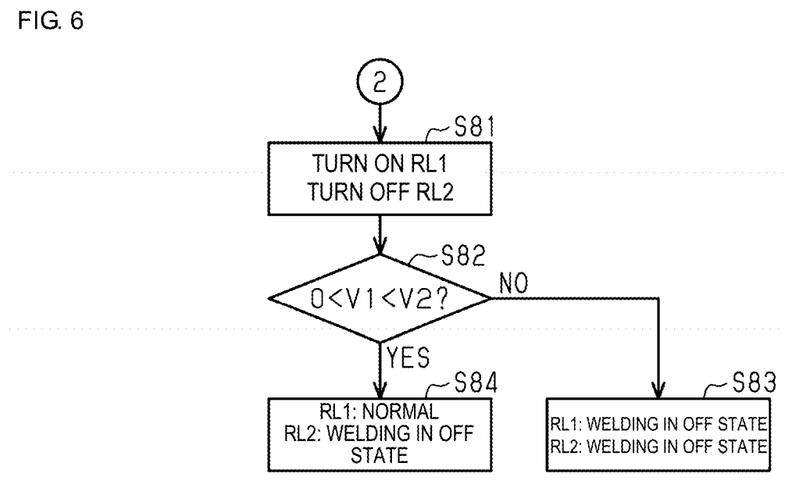
FIG. 6 is a flowchart illustrating a failure determination process.

FIGS. 4 to 6 illustrate a process of determining the presence of welding at the relays RL1 and RL2 in the switching circuit 22.

In step S51, the control unit 26 turns on the relay RL4 in the switching circuit 24 illustrated in FIG. 2. The discharging current of the secondary battery 25 is supplied to the smoothing capacitor C2 via the relay RL4 that has been turned on and is also supplied to the smoothing capacitor C1 via the inductor L1 and the transistor T2 (body diode). The smoothing capacitors C2 and C1 are charged with the currents supplied thereto.

In step S52, the control unit 26 determines whether a predetermined period of time has elapsed. In a case where the predetermined period of time has not elapsed (NO), the process proceeds to step S52. That is, the processing of step S52 is repeatedly performed until the predetermined period of time has elapsed. The predetermined period of time is set on the basis of the capacitance values of the smoothing capacitors C2 and C1 and the amounts of current supplied to the smoothing capacitors C2 and C1.

When it is determined that the predetermined period of time has elapsed (YES), the control unit 26 turns off the relay RL4 after turning on the relay RL3 in step S53.

In step S54, the control unit 26 determines whether the voltage value V2 detected by the voltage sensor 32 is equal to a voltage Vbat across the terminals of the secondary battery 25 (V2=Vbat). When they are not equal (NO), the process proceeds to step S54. When they are equal (YES), the process proceeds to step S55. A voltage across the electrodes of the smoothing capacitor C1 is made to be equal to the voltage Vbat across the terminals of the secondary battery 25 by a supplied current.

In step S55, the control unit 26 turns off the relay RL1 and turns off the relay RL2.

In step S56, the control unit 26 determines whether the voltage value V1 detected by the voltage sensor 31 is equal to 0 (V1=0). When the voltage value V1 is not 0 (NO), the process proceeds to step S71 illustrated in FIG. 5. When the voltage value V1 is not 0, at least one of the relays RL1 and RL2 is welded.

In step S71 illustrated in FIG. 5, the control unit 26 determines whether the voltage value V1 detected by the voltage sensor 31 is lower than the voltage value V2 detected by the voltage sensor 32 (0<V1<V2). When the voltage value V1 is equal to the voltage value V2 (NO), it is determined in step S72 that the relay RL2 is welded in the ON state. At that time, the state of the relay RL1 is unknown.

Subsequently, in step S73, the control unit 26 turns off the relay RL1 and turns on the relay RL2.

In step S74, the control unit 26 determines whether the voltage value V1 is equal to the voltage value V2 (V1=V2). When the voltage values V1 and V2 are equal (YES), it is determined in step S75 that the relay RL1 is welded in the ON state and the relay RL2 is normal.

When the voltage values V1 and V2 are not equal in step S74 (NO), it is determined in step S76 that the relay RL1 is welded in the ON state and the relay RL2 is welded in the OFF state. The welding in the OFF state represents an OFF failure in which a contact does not shift from the OFF state to the ON state or a state where a relay is welded in a large resistance state.

When the voltage value V1 is 0 (YES) in step S56 illustrated in FIG. 4, the process proceeds to step S57. In step S57, the control unit 26 turns off the relay RL1 and turns on the relay RL2.

In step S58, the control unit 26 determines whether the voltage values V1 and V2 are equal (V1=V2). When the voltage values V1 and V2 are not equal (NO), the process proceeds to step S81 illustrated in FIG. 6.

In step S81 illustrated in FIG. 6, the control unit 26 turns on the relay RL1 and turns off the relay RL2.

In step S82, the control unit 26 determines whether the voltage value V1 is lower than the voltage value V2 (0<V1<V2). When the voltage value V1 is not lower than the voltage value V2 (NO), the control unit 26 determines that the relay RL1 is welded in the OFF state and the relay RL2 is welded in the OFF state in step S83. On the other hand, when the voltage value V1 is lower than the voltage value V2 in step S82 (YES), the control unit 26 determines that the relay RL1 is normal and the relay RL2 is welded in the OFF state in step S84.

When the voltage values V1 and V2 are equal (YES) in step S58 illustrated in FIG. 4, the process proceeds to step S59. In step S59, the control unit 26 turns on the relay RL1 and turns off the relay RL2.

In step S60, the control unit 26 determines whether the voltage value V1 is lower than the voltage value V2 (0<V1<V2). When the voltage value V1 is not lower than the voltage value V2 (NO), it is determined in step S91 that the relay RL1 is welded in the OFF state and the relay RL2 is normal.

When the voltage value V1 is lower than the voltage value V2 in step S60 (YES), it is determined that the relays RL1 and RL2 are normal.

Processing for connecting the storage device 18 illustrated in FIG. 2 to the direct-current voltage bus 17 is performed. In step S61, the control unit 26 turns off the relay RL1 and turns off the relay RL2.

In step S62, the control unit 26 turns on the relays RLha and RLhb in the switching circuit 21 illustrated in FIG. 2. Via the relays RLha and RLhb that has been turned on, a current is supplied from the direct-current voltage bus 17 and to the smoothing capacitor C1 via the current-limiting resistor R1 in the inrush current prevention circuit 22a, so that the smoothing capacitor C1 is charged with the current.

In step S63, the control unit 26 determines whether a predetermined period of time has elapsed. In a case where the predetermined period of time has not elapsed (NO), the process proceeds to step S63. That is, the processing of step S63 is repeatedly performed until the predetermined period of time has elapsed. The predetermined period of time is set on the basis of the capacitance value of the smoothing capacitor C1 and the amount of current supplied to the smoothing capacitor C1.

When it is determined that the predetermined period of time has elapsed (YES), the control unit 26 turns on the relay RL1 and turns on the relay RL2 in step S64. At that time, a voltage across the electrodes of the smoothing capacitor C1 illustrated in FIG. 2 is substantially equal to the direct-current voltage of the direct-current voltage bus 17. Accordingly, an inrush current does not flow through the smoothing capacitor C1 and the DC-DC converter 23.

Thus, the control unit 26 connects the storage device 18 to the direct-current voltage bus 17 after determining the presence of welding at each relay.

Next, operations according to the exemplary embodiment will be described.

The storage device 18 is configured to output the output voltage of the secondary battery 25 to the direct-current voltage bus 17. The storage device 18 controls the output of a direct-current voltage to the direct-current voltage bus 17 by opening or closing the switching circuit 21. Accordingly, the secondary battery 25 and the DC-DC converter 23 function as a direct-current power supply for outputting a direct-current voltage to the direct-current voltage bus 17. The storage device 18 supplies the output voltage of the direct-current power supply to the direct-current voltage bus 17 by controlling the opening and closing of the switching circuit 21.

The switching circuit 22 includes the two relays RL1 and RL2 (e.g., first and second relays) connected in series with each other. At a mechanical relay (electromagnetic relay), a failure may occur in which the relay cannot be opened because of the welding of a contact. In a case where a single relay is connected between the DC-DC converter 23 and the switching circuit 21, the DC-DC converter 23 and the switching circuit 21 are continuously connected and cannot be separated from each other because of the contact welding of the electromagnetic relay. Contact welding is highly unlikely to simultaneously occur at the two relays RL1 and RL2. Accordingly, the presence of the series-connected relays RL1 and RL2 between the DC-DC converter 23 and the switching circuit 21 suppresses the continuous connection between the DC-DC converter 23 and the switching circuit 21.

The storage device 18 includes the voltage sensor 31 provided between the negative-side terminal of the secondary battery 25 and the node N1 between the relays RL1 and RL2 in the switching circuit 22 and the voltage sensor 32 connected between the both terminals of the smoothing capacitor C1. At the time of startup, the smoothing capacitor C1 is charged with the discharging current of the secondary battery 25. When at least one of the relays RL1 and RL2 is welded, the voltage value V1 of the node N1 between the relays RL1 and RL2 increases in accordance with the charging voltage (i.e., the voltage value V2) for the smoothing capacitor C1. Accordingly, when the voltage value V1 is 0, it can be determined that either of the relays RL1 and RL2 is not welded.

The control unit 26 opens one of the relays RL1 and RL2 and closes the other one of them. The control unit 26 compares the voltage values V1 and V2 with each other. The node N1 is connected to the high-potential-side terminal of the smoothing capacitor C1 via the relay RL1 and the current-limiting resistor R1. The voltage value V1 obtained when only the relay RL1 is welded and the voltage value V1 obtained when only the relay RL2 is welded therefore differ from each other. On the basis of a result of the comparison, the presence of welding at each of the relays RL1 and RL2 can be determined.

As described above, according to this embodiment, the following effects are obtained.

The storage device 18 includes the switching circuit 21 connected to the direct-current voltage bus 17 and the switching circuit 22 connected between the switching circuit 21 and the DC-DC converter 23. The smoothing capacitor C1 is connected between the DC-DC converter 23 and the switching circuit 22. The switching circuit 22 includes the relays RL1 and RL2 connected in series between the switching circuit 21 and the DC-DC converter 23 and the inrush current prevention circuit 22a connected in parallel with the series circuit of the relays RL1 and RL2. The voltage sensor 31 is connected to the node N1 between the relays RL1 and RL2. The voltage sensor 32 is connected between the both terminals of the smoothing capacitor. The control unit 26 determines the presence of welding at the relays RL1 and RL2 on the basis of the voltage value V1 detected by the voltage sensor 31 and the voltage value V2 detected by the voltage sensor 32.

When at least one of the relays RL1 and RL2 is welded, the voltage value V1 at the node N1 between the relays RL1 and RL2 increases in accordance with the charging voltage (i.e., the voltage value V2) for the smoothing capacitor C1. Accordingly, when the voltage value V1 is 0, it can be determined that either of the relays RL1 and RL2 is not welded. The node N1 is connected to the high-potential-side terminal of the smoothing capacitor C1 via the relay RL2. The node N1 is also connected to the high-potential-side terminal of the smoothing capacitor C1 via the relay RL1 and the current-limiting resistor R1. The voltage value V1 obtained when only the relay RL1 is welded and the voltage value V1 obtained when only the relay RL2 is welded therefore differ from each other. Accordingly, based on the voltage values V1 and V2, the presence of welding at each of the relays RL1 and RL2 can be determined.

The switching circuit 22 includes the two relays RL1 and RL2 connected in series with each other. At a mechanical relay (e.g., electromagnetic relay), a failure may occur in which the relay cannot be opened because of the welding of a contact. In a case where a single relay is connected between the DC-DC converter 23 and the switching circuit 21, the DC-DC converter 23 and the switching circuit 21 are continuously connected and cannot be separated from each other because of the contact welding of the electromagnetic relay. Contact welding is highly unlikely to simultaneously occur at the two relays RL1 and RL2. Accordingly, the presence of the series-connected relays RL1 and RL2 between the DC-DC converter 23 and the switching circuit 21 suppresses the continuous connection between the DC-DC converter 23 and the switching circuit 21.

The above-described embodiment may be implemented as follows.

The inrush current prevention circuit 22a included in the switching circuit 22 used for interconnection protection may be changed as appropriate in the above-described embodiment.

Figure 7:
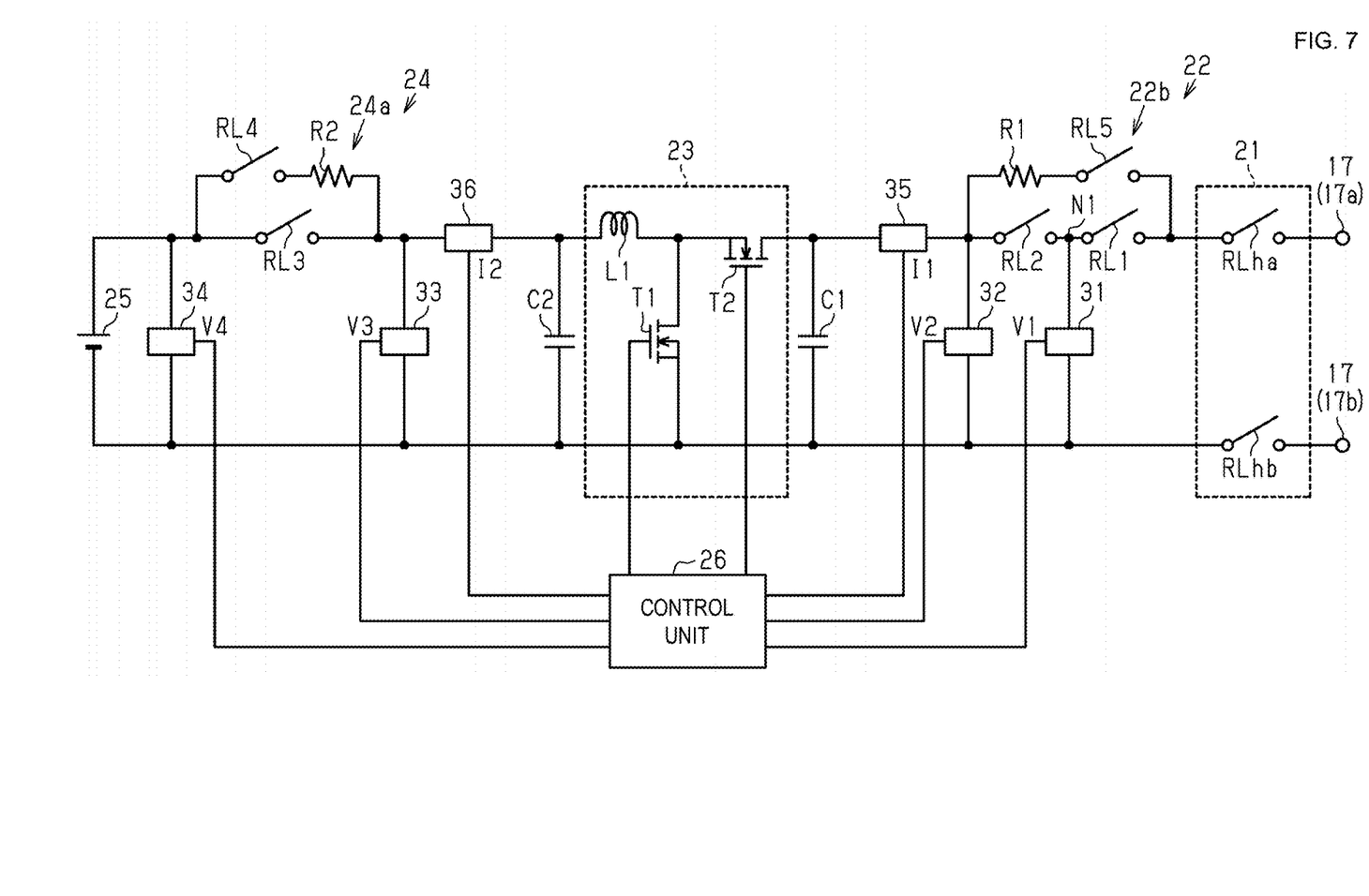
FIG. 7 is a circuit diagram of a direct-current power supply that is a modification.

As illustrated in FIG. 7, an inrush current prevention circuit 22b may be provided in which a relay RL5 is connected in series with the current-limiting resistor R1.

It is noted that the configuration of a power conditioner may be changed as appropriate in the above-described embodiment.

Figure 8:
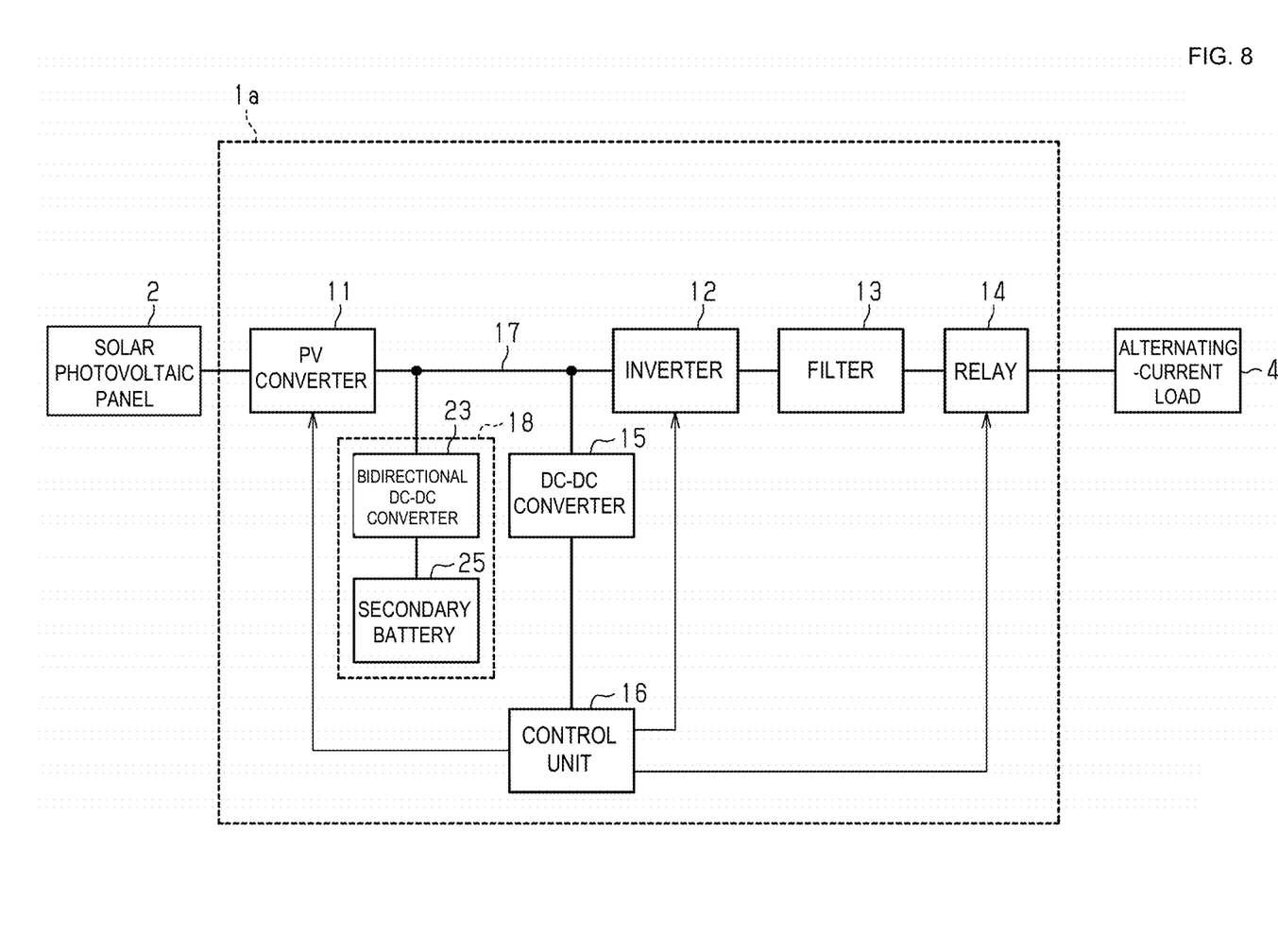
FIG. 8 is a block diagram of a photovoltaic power generation system that is a modification.

As illustrated in FIG. 8, the alternating-current load 4 may be directly connected to a power conditioner 1a (the relay 14). With this configuration, a self-sustained operation can be performed of operating the alternating-current load 4 with power generated by the solar photovoltaic panel 2 and the discharging power of the secondary battery 25.

Figure 9:
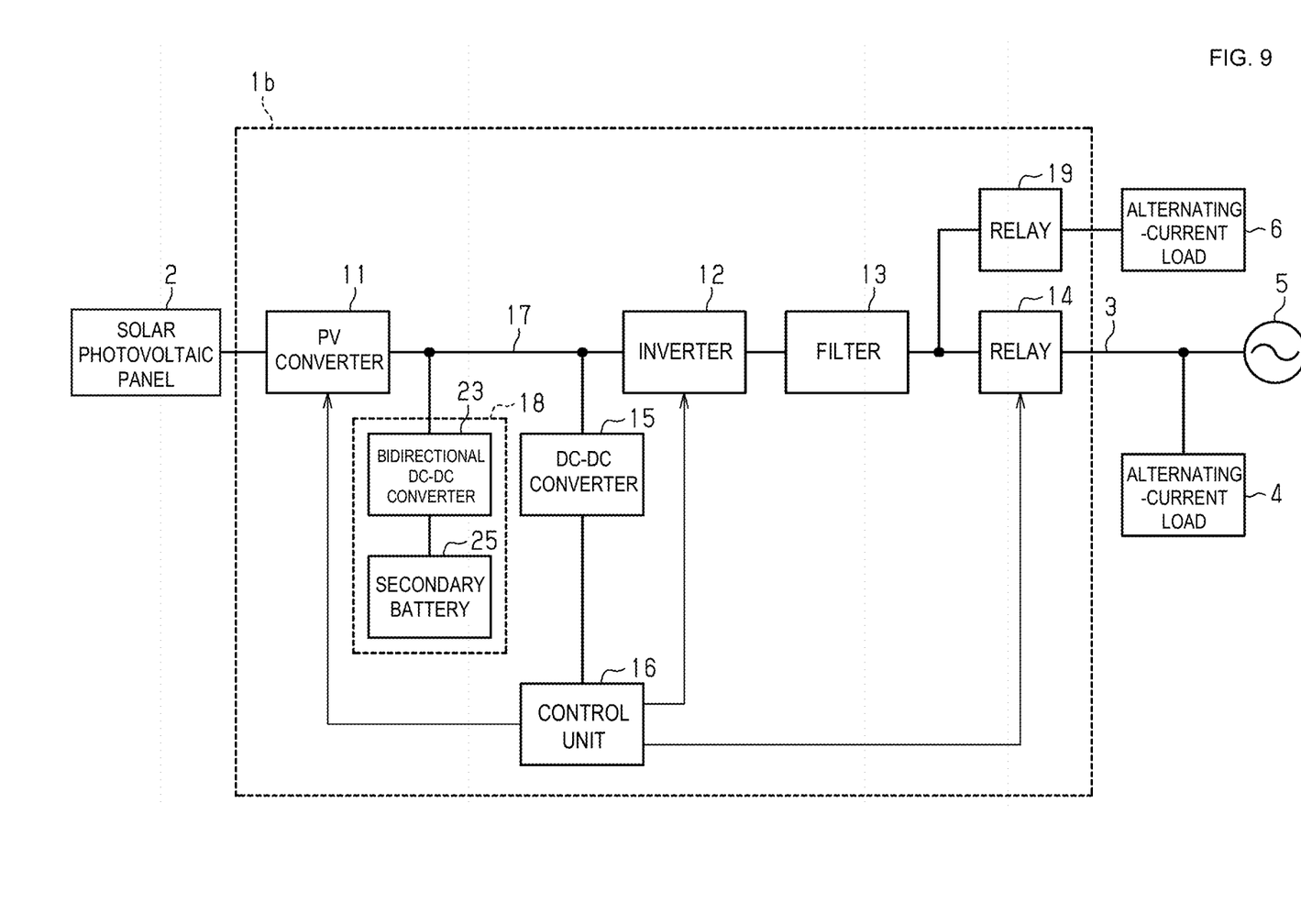
FIG. 9 is a block diagram of a photovoltaic power generation system that is a modification.

As illustrated in FIG. 9, a power conditioner 1b including the relay 14 and a relay 19 may be provided. In this case, alternating-current power that is generated from power from the solar photovoltaic panel 2 in conjunction with the commercial power system 5 can be supplied to the alternating-current load 4 and an alternating-current load 6. When the commercial power system 5 is subjected to power failure, power generated by the solar photovoltaic panel 2 and the discharging power of the secondary battery 25 may be supplied to the alternating-current load 6.

In the above-described embodiment, it is noted that instead of the solar photovoltaic panel 2, a wind power device, a gas power device, a geothermal power device, or the like may be used as a power generator. In this case, the power conditioner 1 includes a conversion unit for the above-described power generator instead of the PV converter 11.

The control unit 26 according to an embodiment may include, for example, one or more memories storing computer-readable instructions configured to realize various controls described in the embodiment and one or more processors configured to execute the computer-readable instructions. The control unit 26 may be an integrated circuit, such as an application-specific integrated circuit (ASIC).

REFERENCE SIGNS LIST 17 direct-current voltage bus (object to be connected)
18 storage device
25 secondary battery
21 switching circuit (first switching circuit)
22 switching circuit (second switching circuit)
22a first inrush current prevention circuit
23 DC-DC converter
24 switching circuit (third switching circuit)
24a second inrush current prevention circuit
25 secondary battery
26 control unit
RL1 relay (first relay)
RL2 relay (second relay)
RL3 relay (third relay)
RL4 relay (fourth relay)
R1 current-limiting resistor (first current-limiting resistor)
R2 current-limiting resistor (second current-limiting resistor)
31 voltage sensor (first voltage detection unit)
32 voltage sensor (second voltage detection unit)
33 voltage sensor (third voltage detection unit)
34 voltage sensor (fourth voltage detection unit)
V1 voltage value (first voltage value)
V2 voltage value (second voltage value)

The invention claimed is:

1. A power supply device comprising:
a direct-current power supply;
a first switching circuit configured to couple the direct-current power supply to an object and to separate the direct-current power supply from the object;
a second switching circuit that includes a series circuit including a first relay and a second relay connected in series between the first switching circuit and the direct-current power supply, and a first inrush current prevention circuit connected in parallel with the series circuit;
a first capacitor connected between the direct-current power supply and the second switching circuit;
a first voltage sensor configured to detect a voltage between a low-voltage-side terminal of the first capacitor and a node between the first and second relays;
a second voltage sensor configured to detect a voltage between the low-potential-side terminal and a high-potential-side terminal of the first capacitor; and
a control unit configured to control the first switching circuit and the second switching circuit.

2. The power supply device according to claim 1, wherein the first inrush current prevention circuit includes a first current-limiting resistor connected between a terminal of the second relay on a side of the direct-current power supply and a terminal of the first relay on a side of the first switching circuit.

3. The power supply device according to claim 1, wherein the first inrush current prevention circuit includes a first current-limiting resistor and a relay connected in series between a terminal of the second relay on a side of the direct-current power supply and a terminal of the first relay on a side of the first switching circuit.

4. The power supply device according to claim 1, wherein the direct-current power supply includes a secondary battery and a bidirectional DC-DC converter configured to perform voltage conversion upon a first output voltage that is output by the secondary battery and to output a first resultant voltage to the object.

5. The power supply device according to claim 4, wherein the bidirectional DC-DC converter is further configured to perform voltage conversion upon a second output voltage that is output by the object and to output a second resultant voltage to the secondary battery.

6. The power supply device according to claim 5, further comprising a third switching circuit including a third relay connected between the secondary battery and the bidirectional DC-DC converter, and a second inrush current prevention circuit connected in parallel with the third relay.

7. The power supply device according to claim 6, further comprising a second capacitor connected between the third switching circuit and the bidirectional DC-DC converter.

8. The power supply device according to claim 7, wherein the second inrush current prevention circuit includes a second current-limiting resistor and a fourth relay connected in series between both terminals of the third relay.

9. A power control apparatus that converts a direct-current voltage input from a power generator into an alternating-current voltage, the power control apparatus comprising:
- a direct-current voltage bus that receives a direct-current voltage input from the power generator;
- an inverter configured to convert a direct-current voltage of the direct-current voltage bus into an alternating-current voltage; and
- a power supply device coupled to the direct-current voltage bus and including:
  - a direct-current power supply,
  - a first switching circuit configured to couple the direct-current power supply to the direct-current voltage bus and to separate the direct-current power supply from the direct-current voltage bus,
    - a second switching circuit that includes a series circuit including a first relay and a second relay connected in series between the first switching circuit and the direct-current power supply, and a first inrush current prevention circuit connected in parallel with the series circuit,
    - a first capacitor connected between the direct-current power supply and the second switching circuit,
    - a first voltage sensor configured to detect a voltage between a low-voltage-side terminal of the first capacitor and a node between the first and second relays,
    - a second voltage sensor configured to detect a voltage between the low-potential-side terminal and a high-potential-side terminal of the first capacitor, and
    - a control unit configured to control the first switching circuit and the second switching circuit.

10. The power control apparatus according to claim 9, wherein the power generator is a solar photovoltaic panel.

11. The power control apparatus according to claim 10, further comprising a voltage conversion circuit that is connected to the solar photovoltaic panel and is configured to convert a first direct-current voltage output from the solar photovoltaic panel into a second direct-current voltage and to output the second direct-current voltage to the direct-current voltage bus.

12. The power control apparatus according to claim 11, wherein the first inrush current prevention circuit includes a first current-limiting resistor connected between a terminal of the second relay on a side of the direct-current power supply and a terminal of the first relay on a side of the first switching circuit.

13. The power control apparatus according to claim 11, wherein the first inrush current prevention circuit includes a first current-limiting resistor and a relay connected in series between a terminal of the second relay on a side of the direct-current power supply and a terminal of the first relay on a side of the first switching circuit.

14. The power control apparatus according to claim 11, wherein the direct-current power supply includes a secondary battery and a bidirectional DC-DC converter configured to perform voltage conversion upon a first output voltage that is output by the secondary battery and to output a first resultant voltage on the direct-current voltage bus.

15. The power control apparatus according to claim 14, wherein the bidirectional DC-DC converter is further configured to perform voltage conversion upon a second output voltage on the direct-current voltage bus and to output a second resultant voltage to the secondary battery.

16. The power control apparatus according to claim 15, wherein the power supply device further comprises:
- a third switching circuit including a third relay connected between the secondary battery and the bidirectional DC-DC converter, and a second inrush current prevention circuit connected in parallel with the third relay; and
- a second capacitor connected between the third switching circuit and the bidirectional DC-DC converter.

17. The power control apparatus according to claim 16, wherein the second inrush current prevention circuit includes a second current-limiting resistor and a fourth relay connected in series between both terminals of the third relay.

18. A power supply device relay determination method for a power supply device that includes a direct-current power supply, a first switching circuit configured to couple the direct-current power supply with an object and to separate the direct-current power supply from the object, a second switching circuit having a series circuit including first and second relays connected in series between the first switching circuit and the direct-current power supply, and a first inrush current prevention circuit connected in parallel with the series circuit, a first capacitor connected between the direct-current power supply and the second switching circuit, a first voltage sensor that detects a voltage between a low-voltage-side terminal of the first capacitor and a node between the first relay and the second relay, and a second voltage sensor that detects a voltage between the low-potential-side terminal and a high-potential-side terminal of the first capacitor, the power supply device relay determination method comprising:
- opening and closing the first relay and the second relay by a control unit; and
- determining a presence of welding at the first relay and the second relay based on a first voltage value detected by the first voltage sensor and a second voltage value detected by the second voltage sensor.

19. The power supply device relay determination method according to claim 18, further comprising:
- determining, by the control unit, the presence of welding at the first relay and the second relay based on a first comparison result and a second comparison result,
- wherein the first comparison result is based on a comparison between a first voltage value detected by the first voltage sensor and a second voltage value detected by the second voltage sensor in a state where the first relay is opened and the second relay is closed, and
- wherein the second comparison result is based on a comparison between the first voltage value detected by the first voltage sensor and the second voltage value detected by the second voltage sensor in a state where the first relay is closed and the second relay is opened.

20. The power supply device relay determination method according to claim 18, wherein the direct-current power supply includes a secondary battery, a bidirectional DC-DC converter that performs a voltage conversion upon a first output voltage that is output by the secondary battery and outputs a first resultant voltage to the object and that performs a voltage conversion upon a second output voltage that is output by the object and outputs a second resultant voltage to the secondary battery, a third switching circuit that includes a third relay connected between the secondary battery and the bidirectional DC-DC converter, and a second inrush current prevention circuit connected in parallel with the third relay, with the second inrush current prevention circuit including a fourth relay and a second current-limiting resistor connected in series, and a second capacitor connected between the third switching circuit and the bidirectional DC-DC converter, and wherein the power supply device relay determination method further comprises:

closing, by the control unit, the third relay after a predetermined period of time has elapsed from closing of the fourth relay; and determining the presence of welding at the first relay and the second relay in a state where the fourth relay is opened.

* * * * *